1

3,703,534
19-NORTESTOSTERONE ESTERS
Silvano Casadio and Gianfranco Pala, Milan, Italy, assignors to Istituto de Angeli S.p.A., Milan, Italy
No Drawing. Filed Nov. 25, 1970, Ser. No. 92,847
Int. Cl. C07c 169/22
U.S. Cl. 260—397.4
5 Claims

ABSTRACT OF THE DISCLOSURE

There are provided novel esters of 19-nortestosterone having valuable anabolic activity. The esters have the general formula

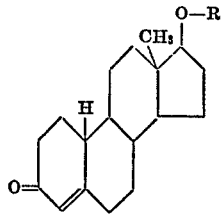

in which R represents the acyl radical of an acid selected from the group consisting of terpenic, homoterpenic and terpenylacetic acids, said acid being derived from a terpene selected from the group consisting of $a,\beta$-saturated mono- and sesqui-terpenes containing 1–3 2-methyl-but-2-ene units.

---

This invention refers to new esters of 19-nortestosterone having valuable pharmacological properties.

According to the present invention, there are provided esters of 19-nortestosterone having the general formula

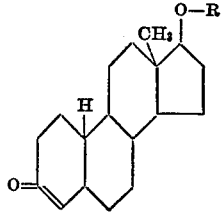

(I)

in which R represents the acyl radical of an $a,\beta$-saturated terpenic acid, homoterpenic acid or terpenylacetic acid, the said acid being derived from an $a,\beta$-saturated acyclic mono- or sesqui-terpene containing 1–3[2-methyl-but-2-ene] units.

It will be appreciated that the above-mentioned acid referred to in the definition of R may contain from 10 to 17 carbon atoms.

The compounds according to the invention possess a relatively long-lasting anabolic activity coupled with a low androgenic activity.

In the compounds of Formula I as hereinbefore defined, R preferably represents the acyl radicals of citronellic, homogeranic, eranylacetic, nerylacetic, homofarnesic and farnesylacetic acids.

It will be appreciated that compounds of Formula I may contain one or two asymmetric double bonds in the acyl moiety and may therefore exist in the cis and trans forms and in the form of mixtures thereof, all of which are within the scope of the present invention. For example, the acyl radicals of homofarnesic and farnesylacetic acids, which contain two asymmetric double bonds, can exist in the trans-trans, trans-cis, cis-trans and cis-cis forms and in the form of mixtures of such stereo-isomers. For the purpose of the present specification, references to the "trans-trans/cis-trans" and "trans-cis/cis-cis" forms of homofarnesic and farnesylacetic acids are to be understood as meaning mixtures obtainable when preparing such acids, and reactive derivatives thereof, starting from natural trans-nerolidol and synthetic cis-nerolidol respectively. In the "trans-trans/cis-trans" form, the ratio of the two steroisomers is generally about 2:1; the same applies to the "trans-cis/cis-cis" form.

The anabolic and androgenic activities and the long-lasting anabolic action of compounds according to the invention have been studied in 21 days old castrated male rats with the technique described by Hershberger et al. in Proc. Soc. Expt. Biol. Med., 38, 175, 1963, using as a reference standard 19-portestosterone phenyl propionate (NTPP). The compounds, suspended in olive oil, were administered subcutaneously at a single dose of 8 mg./rat expressed as 19-nortestrosterone). Groups of 8 animals treated with the compound under examination, along with the corresponding controls, were sacrificed after 1, 2, 3, 4, 5, 6, and 8 weeks, respectively and the elevator anus muscles, the prostates and the seminal vesicles taken out and weighed.

Preferred compounds for their particularly useful anabolic activity are compounds of Formula I in which R represents the acyl radicals of homofarnesic and farnesylacetic acids. Such compounds have a particularly high and long-lasting anabolic activity in general coupled with low androgenic activity. A particularly preferred compound is 19-nortestosterone 17$\beta$- "trans-trans/cis trans" homofernesate which has about 1.5 times the anabolic activity of NTPP, whilst its androgenic activity is about one half that of NTPP. In addition the duration of its anabolic activity is about 7–8 weeks which compares with about 4–5 weeks for NTPP.

The compounds of Formula I in which R represents the acyl radicals of citronellic, homogeranic, geranylacetic and neryl-acetic acids, though having practically the same anabolic activity and the same androgenic actvity as NTPP, exhibit an anabolic activity of longer duration, allowing therefore a more spaced administration of the compounds with consequent reduction of the unwanted side-effects associated with the androgenic activity.

According to a further feature of the present invention there is provided a process for the preparation of the compounds of Formula I as defined above which comprises reacting 19-nortestosterone with the appropriate acyclic terpenic, homoterpenic or terpenylacetic acid or a reactive derivative thereof to effect esterification. Preferred reactive derivatives include the halides and anhydrides of the terpenic acid.

In a particularly advantageous method of carrying out the process according to the invention, compounds of Formula I are prepared by reacting 19-nortestosterone with the halide, preferably the chloride, of the appropriate acid at a temperature ranging between 0 and 100° C., under substantially anhydrous conditions and preferably in an inert atmosphere (e.g. a nitrogen atmosphere). The reaction is preferably carried out in the presence of an acid binding agent and an inert organic solvet, the 19-nortestosterone not necessarily being soluble in the solvent. Acid binding agents which may be used with advantage include tertiary organic bases such as for example pyridine, picolines, quinoline, dimethylaniline and trimethylamine. Suitable inert solvents include for example chloroform, carbon tetrachloride, ether and pyridine. Pyridine is thus an example of a compound which may be used both as acid binding agent and as a solvent.

According to a further preferred method of carrying out the process according to the invention 19-nortestosterone is reacted with the anhydride of the appropriate terpenic, homoterpenic or terpenylacetic acid under substantially the same conditions as described above in connection with the reaction using the acid halide.

In a still further preferred method of carrying out the process according to the invention, 19-nortestosterone is reacted with the appropriate terpenic, homoterpenic or terpenylacetic acid at an elevated temperature, preferably at 210° to 215° C., advantageously with stirring and preferably under a nitrogen atmosphere.

The impure product of Formula I isolated from the reaction medium may advantageously be purified by chromatography, for instance on alumina, benzene being preferably used as eluent. The compounds of Formula I according to the invention are in general practically colourless viscous oils, insoluble in water but mostly soluble in the common organic solvents.

According to a still further feature of the present invention there are provided pharmaceutical compositions for parenteral administration which comprises at least one compound of Formula I as defined above in association with a pharmaceutical carrier. The compositions are conveniently in the form of dosage units such as vials containing injectable solutions. Each dosage unit preferably contains from 10 to 300 mg. of active ingredient, advantageously from 25 to 150 mg. per dosage unit in compositions for parenteral administration.

The following examples illustrate the invention:

EXAMPLE 1

3.387 g. (0.0126 mole) of "trans-trans/cis-trans" homofarnesyl chloride [the corresponding acid was obtained from natural trans nerolidol according to the method described by G. Lucius, Chem. Ber., 93, 2663 (1960)] are added during 15 minutes, with stirring and under a nitrogen atmosphere, to a solution of 2.46 g. (0.009 mole) of 19-nortestosterone in 8 ml. of anhydrous pyridine, the temperature being maintained at about 20° C. The reaction mixture is stirred overnight at room temperature, then diluted with anhydrous ether and filtered. The solution, washed with 2% aqueous HCl and then with water until neutral, is dried over magnesium sulphate and evaporated under reduced pressure. The crude product obtained, dissolved in benzene, is purified by chromatography on 50 g. of acid alumina and eluting with benzene. After evaporation of the solvent under reduced pressure, 19 - nortestosterone 17β - "trans-trans/cis-trans" homofarnesate is obtained as a practically colourless viscous oil, $R_f$ 0.85.

*Analysis.*—For $C_{34}H_{50}O_3$: Found (percent): C, 80.78; H, 9.95. Calc. (percent): C, 80.58; H, 9.95.

The following compounds were also obtained by analogous methods. All the listed compounds are practically colourless viscous oils.

19-nortesetosterone 17β-citronellate, $R_f$ 0.81

*Analysis.*—For $C_{28}H_{42}O_3$: Found (percent): C, 78.80; H, 9.71. Calc. (percent): C, 78.82; H, 9.92.

19-nortestosterone 17β- geranylacetate, $R_f$ 0.85

*Analysis.*—For $C_{30}H_{44}O_3$: Found (percent): C, 79.05; H, 9.78. Calc. (percent): C, 79.60; H, 9.80.

19-nortestosterone 17β-nerylacetate, $R_f$ 0.82

*Analysis.*—For $C_{30}H_{44}O_3$: Found (percent): C, 78.97; H, 9.18. Calc. (percent): C, 79.60; H, 9.80.

19-nortestosterone 17β-"trans-cis/cis-cis" homofarnesate, $R_f$ 0.85

*Analysis.*—For $C_{34}H_{50}O_3$: Found (percent): C, 79.93; H, 10.21. Calc. (percent): C, 80.58; H, 9.95.

(The corresponding acid was obtained from synthetic cis nerolidol according to the method described by G. Lucius, Chem. Ber., 93, 2663 (1960).)

19-nortestosterone 17β-"trans-cis/cis-cis" farnesylacttate $R_f$ 0.85

*Analysis.*—For $C_{35}H_{52}O_3$: Found (percent): C, 80.81; H, 10.17. Calc. (percent): C, 80.72; H, 10.07.

(The corresponding acid was obtained from synthetic cis nerolidol according to the method described by P. Dietrich and E. Lederer, Helv. Chim. Acta, 35, 1148 (1952).)

EXAMPLE 2

A solution of 0.82 g. (0.003 mole) of 19-nortestosterone in 3 ml. of anhydrous pyridine is reacted, as described in Example 1, with 3.06 g. (0.006 mole) of "trans-trans/cis-trans" farnesylacetic anhydride. (The corresponding acid was obtained from natural trans nerolidol according to the method described by P. Dietrich and E. Lederer, Helv. Chim. Acta, 35, 1148 (1958).)

The reaction mixture is worked up as in Example 1, 19 - nortestosterone 17β-"trans-trans/cis-trans" farnesylacetate being obtained as a practically colourless viscous oil, $R_f$ 0.87.

*Analysis.*—For $C_{35}H_{52}O_3$: Found (percent): C, 81.35; H, 9.82. Calc. (percent): C, 80.72; H, 10.07.

EXAMPLE 3

0.548 g. (0.002 mole) of 19-nortestosterone, 0.562 g. (0.0028 mole) of homogeranyl chloride and 3 ml. of anhydrous pyridine are reacted by heating on a steam bath overnight. The reaction mixture is worked up as described in Example 1, 19-nortestosterone 17β-homogeranate being obtained as a practically colourless viscous oil, $R_f$ 0.85.

*Analysis.*—For $C_{29}H_{42}O_3$: Found (percent): C, 79.18; H, 9.71. Calc. (percent): C, 79.40; H, 9.65.

The $R_f$ values have been determined on glass chromathostrips coated with Merck Silica Gel G., solvent benzene/acetone 8:2. The spots have been developed by spraying with a 1% solution of vanillin in concentrated sulphuric acid and heating at 100° C. for 15 minutes.

EXAMPLE 4

A mixture of 0.82 g. (0.003 mole) of 19-nortestosterone and 3 g. (0.012 mole) of homofarnesic acid is heated at 210–215° C., with stirring and under a nitrogen atmosphere. After 2 hours the reaction mixture is diluted with ether, washed with an aqueous solution of sodium carbonate, then with water, dried and evaporated to dryness. The crude product obtained is purified by the procedure described in Example 1. 19-nortestosterone 17-β "trans-trans/cis-trans" homofarnesate is thus obtained.

EXAMPLE 5

Vials (for weekly administration)

19 - nortestosterone 17-β "trans-trans/cis-trans" homofarnesate—25 mg., and
(a) Vegetable oil (almond, olive, castor or peanut oil or mixture thereof);
(b) ethyl oleate; or
(c) A vegetable oil (or ethyl oleate) containing 10% of benzilic or phenylethyl alcohol q.s. to 1 ml.

EXAMPLE 6

Vials (for monthly administration)

19-nortestosterone 17-β "trans-trans/cis-trans" homofarnesate _____ mg__ 100
Benzilic alcohol _____ ml__ 0.5
Vegetable oil or ethyl oleate q.s. to 5 ml.

We claim:
1. An ester of 19-nortestosterone of general formula

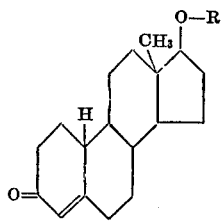

(I)

wherein R represents the acyl radical of an acid selected from the group consisting of terpenic, homoterpenic and terpenylacetic acids, said acid being derived from a terpene selected from the group consisting of α,β-saturated acyclic mono- and sesqui-terpenes containing 1–3 2-methylbut-2-ene units.

2. An ester of 19-nortestosterone according to claim 1 wherein R represents a homofarnesyl radical.

3. An ester of 19-nortestosterone according to claim 1 wherein R represents a homofarnesyl radical having the "trans-trans/cis-trans" configuration.

4. An ester of 19-nortestosterone according to claim 1 wherein R represents a farnesylacetyl radical.

5. An ester of 19-nortestosterone according to claim 1 wherein R represents an acyl radical selected from the group consisting of citronellyl, homogeranyl, geranylacetyl and nerylacetyl radicals.

References Cited
UNITED STATES PATENTS

| | | | |
|---|---|---|---|
| 2,885,413 | 5/1959 | Hogg et al. | 260—397.45 |
| 3,238,232 | 3/1966 | Borrevang | 260—397.4 |
| 3,472,883 | 10/1969 | Kruger | 260—397.3 |
| 3,475,464 | 10/1969 | Halpern | 260—397.4 |
| 3,479,375 | 11/1969 | De Visser et al. | 260—397.4 |

HENRY A. FRENCH, Primary Examiner

U.S. Cl. X.R.

424—243

UNITED STATES PATENT OFFICE
CERTIFICATE OF CORRECTION

Patent No. 3,703,534            Dated July 18, 1972

Inventor(s) Silvano Casadio and Gianfranco Pala

It is certified that error appears in the above-identified patent and that said Letters Patent are hereby corrected as shown below:

Column 1, after line 5, there should be inserted

--Claims priority Application Great Britain, Dec. 11, 1969, 60628/69--.

Signed and sealed this 5th day of March 1974.

(SEAL)
Attest:

EDWARD M. FLETCHER, JR.        C. MARSHALL DANN
Attesting Officer                Commissioner of Patents